United States Patent Office 3,586,620
Patented June 22, 1971

3,586,620
METHOD OF ACTIVATING A HYDROCRACKING CATALYST
Algie J. Conner, Downers Grove, and Frank H. Adams, Riverside, Ill., assignors to Universal Oil Products Company, Des Plaines, Ill.
No Drawing. Filed Feb. 13, 1969, Ser. No. 799,100
Int. Cl. C10g 13/00
U.S. Cl. 208—111                     22 Claims

ABSTRACT OF THE DISCLOSURE

A hydrocracking catalyst in an oxidized state is activated by a method which gives a superior performing hydrocracking catalyst. The hydrocracking catalyst is reduced and sulfided by a procedure which allows a liquid hydrocarbon stream to be in contact with the hydrocracking catalyst during reduction and sulfiding. The presence of the liquid hydrocarbon stream during reduction and sulfiding operations reduces the effects of native water and water of reduction which decrease hydrocracking catalyst activity and selectivity.

BACKGROUND OF THE INVENTION

Field of the invention

This invention relates to the field of art commonly referred to as catalyst activation or catalyst start-up. More particularly, this invention relates to a method of activation of an amorphous or crystalline hydrocracking catalyst through the use of a reduction and sulfiding procedure which may be performed in the presence of native water or water of reduction without detrimental effects to the hydrocracking catalyst. More particularly, this invention relates to a method of reduction and sulfiding of a hydrocracking catalyst contained in a hydrocracking reaction zone by reduction and sulfiding of the hydrocracking catalyst in the presence of a liquid hydrocarbon stream followed by the subsequent increase in catalyst temperature to promote hydrocracking reactions. This procedure allows integrated start-up and lined out operations to be performed in the hydrocracking reaction zone.

Description of the prior art

As a general rule, most hydrocracking catalysts that contain ion-exchanged or impregnated metallic components are used in commercial hydrocracking reaction zones in a reduced and sulfided state. Commercial hydrocracking catalysts are generally reduced and sulfided prior to the introduction of processing feed stock in order to stabilize the hydrocracking catalyst by taking an "edge" off the catalyst activity. The reduction and sulfiding in most cases eliminates the possibility of extreme runaways and high temperature conditions in the hydrocracking catalyst reaction zone which can cause permanent injury to the hydrocracking catalyst.

In the commercial preparation of hydrocracking catalysts, reduction and sulfiding of the hydrocracking catalyst is generally done under controlled conditions, which in most cases, permit the sulfiding of the hydrocracking catalyst to be accomplished in an exclusively dry atmosphere. However, in commercial hydrocracking catalyst reaction zones in which an oxidized hydrocracking catalyst is loaded into a hydrocracking reactor, there is present in the reaction vessel and the various feed and effluent lines a relatively large amount of water from previous clean-up operations or from the atmosphere. In order to prevent degradation of the hydrocracking catalyst by native water and water present from reduction of metallic components in the hydrocracking catalyst, it is very often necessary to reduce the water content of material in the hydrocracking reactor through complicated and often time-consuming drying operations. In some cases, high temperature inert gas purge streams are passed through a hydrocracking reaction zone catalyst bed to remove all native water present in the catalyst and the reaction zone itself. Reduction is then accomplished by a high temperature hydrogen purge with the water or reduction produced removed from recycle gas streams through driers or subsequently removed from the hydrocracking catalyst reaction zone by a hydrogen or another high temperature inert gas purge prior to sulfiding operations.

We have found that through the use of the method of activation of our invention that the presence of native water and water of reduction does not adversely affect the hydrocracking catalyst when this water is present during sulfiding operations. In using the process of our invention for the activation of a hydrocracking catalyst, there is no need to dry recycle gas streams or to extensively dry the system in which the hydrocracking catalyst is contained prior to and during reduction and sulfiding operations.

SUMMARY

It is an object of the present invention to activate an oxidized hydrocracking catalyst by reduction and sulfiding steps which give an activated hydrocracking catalyst having superior activity and selectivity. It is another object of the present invention to reduce and sulfide a hydrocracking catalyst by a method which precludes the necessity of extensive high temperature gaseous purging of a hydrocracking catalyst reaction zone to remove native water from the system. It is still another object of the process of this invention to contact a hydrocracking catalyst with a liquid hydrocarbon stream while reduction and sulfiding operations are taking place to prevent the detrimental effects of the presence of water on the hydrocracking catalyst activity and selectivity during normal hydrocracking operations after reduction and sulfiding of the hydrocracking catalyst according to the process of this invention. It is another object of the present invention to eliminate the need for extensive drying of hydrocarbon feed stocks and hydrogen gas streams used during the reduction and sulfiding activation methods of the process of this invention.

The process of this invention relates to the activation of a hydrocracking catalyst which is in an oxidized state and which is present in a hydrocracking reaction zone. In referring to the oxidized state of a hydrocracking catalyst, the art generally refers to the oxidized hydrogenating-dehydrogenating components of the catalyst. The hydrogenating components are generally selected from the Group VIII metals of the Periodic Table of The Elements and include iron, cobalt, nickel, ruthenium, rhodium, palladium, osmium, iridium and platinum. When referring to an oxidized hydrocracking catalyst in this specification, we refer to the hydrogenating-dehydrogenating components of the catalyst recited above that are substantially in the oxidized state.

In order to start up hydrocracking catalyst reaction systems without adversely harming the hydrocracking catalyst activity and selectivity, it is preferred to begin hydrocracking operations with substantially all of the hydrogenating-dehydrogenating components of the catalyst in a sulfided state. Sulfiding reduces the initial high activity associated with most hydrocracking catalyst containing Group VIII metals, thereby reducing production of excess dry gaseous material while maintaining catalyst stability.

The cracking components of the hydrocracking catalyst are generally derived from the base or carrier materials, which contain deposited thereon the hydrogenating-dehydrogenating components. Acidic bases or carriers, which may be used as hydrocracking catalyst are the silica aluminas and the crystalline aluminosilicates. The amorphous hydrocracking catalyst may be prepared in any suitable manner, one method being to commingle water glass and a mineral acid, such as hydrochloric acids, sulfuric acid, etc., under conditions to precipitate a silica hydrogel. A silica hydrogel is then allowed to age after the pH has been adjusted to a proper level to allow the silica to at least partially polymerize. Following the aging of the silica gel, the pH is then raised by the addition of a basic substance, such as ammonium hydroxide, sodium hydroxide, etc., to neutralize acid present in the contacting of acid and water glass. Following this, aluminum in the form of an aluminum sulfate, aluminum chloride, aluminum nitrate, etc., is added to the silica gel. A silica alumina hydrogel is precipitated and treated by washing, filtering, reslurrying, spray drying and calcination in the usual manner. The active metallic component of the catalyst is then composited with cracking component generally in amount from about 0.01% to about 20% by weight of the catalyst.

The aforementioned desirable metal components to be incorporated into the catalyst comprise the Group VIII metals and may be incorporated into the catalyst base in any suitable manner. One such manner is to composite the metal component with the cracking component by forming an aqueous solution of the halide of the metals such as platinum chloride, palladium chloride, etc., further diluting the solution and adding the resultant diluted solution to the cracking component in a steam drier. Other suitable metal solutions may be employed such as colloidal solutions or suspensions, including the desirable metal cyanides, metal hydroxides, metal oxides, metal sulfides, etc. In cases where these solutions are not soluble in water at the temperature used, other suitable solvents, such as alcohols, ethers, etc., may be utilized.

Both the natural and synthetic zeolitic alumino-silicates may be activated by the present invention. A crystalline zeolitic aluminosilicate encompassed by the present invention includes aluminosilicate cage structures in which the alumina and the silica tetrahedra are intimately connected with each other in an open three-dimensional crystalline network. The tetrahedra are cross-linked by the sharing of oxygen atoms. The spaces between the tetrahedra are occupied by water molecules prior to dehydration. The dehydration results in crystals interlaced with channels of molecular dimensions. Thus, the crystalline zeolitic aluminosilicates are often referred to as molecular sieves. In the hydrated form, the aluminosilicate may be represented by the formula represented in Equation 1, $$M_{2/n}O:Al_2O_3:wSiO_2:yH_2O \qquad (1)$$

where M is a cation which balances the electrovalence of the tetrahedra, $n$ represents the valence of the cation, $w$, the moles of $SiO_2$, and $y$, the moles of water. The cation may be any one of a number of ions, such as for example, the alkali metal ions, the alkaline earth ions, or rare earth ions. The cations may be mono-, di-, or trivalent.

Crystalline aluminosilicates, which find use in the process of this invention possess relatively well-defined pore structures. The exact type aluminosilicate is generally defined by the silica/alumina ratio and the pore dimensions. The faujasites are commonly represented as type X and type Y aluminosilicates and are defined by their varying silica to alumina ratios.

The synthesized zeolite type X can be represented in terms of mole oxides as represented in the following equation number 2, $$0.9 \pm 0.2 M_{2/n}O:Al_2O_3:2.5 \pm 0.5 SiO_2:yH_2O \qquad (2)$$

where M represents at least one cation having the valence of not more than 3, $n$ represents the valence of M, and $y$ is value up to about 8 depending on the identity of M and the degree of hydration of the crystal. Zeolite type X is described in U.S. Patent 2,882,244.

The type Y zeolite may be represented in the terms of the mole ratio of oxides for the sodium form as represented in the following equation number 3, $$0.9 \pm 0.2 Na_2O:Al_2O_3:wSiO_2:yH_2O \qquad (3)$$

wherein $w$ is a value greater than 3 and up to about 6 and $y$ may be a value up to about 9. The type Y zeolite is described in U.S. Patent 3,130,007.

The crystalline aluminosilicates for hydrocracking catalysts contain metallic components selected from the Group VIII metals. These metallic components may be composited with the base or carrier (crystalline aluminosilicate) in amounts from about 0.1% to about 20% by weight of the catalyst. The metal component may be composited in manners similar to those explained for the amorphous aluminosilicate type catalyst. When the metallic components are composited on the crystalline aluminosilicate base or carrier, they are generally placed on the aluminosilicate by impregnation or base exchange means.

The process of the activation of a hydrocracking catalyst as expressed in this specification may be performed in both single stage hydrocracking reaction zones and in dual reactor hydrorefining-hydrocracking processes. In single stage hydrocracking reaction zones, the hydrocracking catalyst activation process is operated with a hydrocarbon feed stock containing less than about 500 wt. p.p.m. nitrogen. Hydrocarbon feed stocks passing into hydrocracking reaction zones during activation procedures which contain nitrogen contents in the excess of 500 wt. p.p.m. appeared to have detrimental effects on the subsequent performance of the hydrocracking catalyst after reduction and sulfiding operations have been concluded and when normal lined-out hydrocracking reactions are taking place.

In single stage hydrocracking reactor processes, the method of activation of this invention is generally performed as follows. A suitable inert gas is first passed through the hydrocracking catalyst reaction zone to remove any oxygen present or any other undesirable gases or any large amounts of entrained water. After a suitable low temperature inert gas purge, a mass of hydrocracking catalyst present in the reactor is contacted with a stream of gaseous hydrogen at temperatures within the range of from about 0° F. to about 350° F. and at an elevated pressure generally greater than about 500 p.s.i.g. At temperatures below about 400° F., there appears to be no reduction of metallic components present on the hydrocracking catalyst and therefore, little water or reduction is produced. The hydrogen now in intimate contact with the mass of hydrocracking catalyst is generally continuously being circulated into and out of the hydrocracking catalyst reaction zone by a recycle means, which includes recycle gas compressors. It is preferred in the method of activation as presented in this specification to have a continuously circulating gaseous hydrogen stream contacting the mass of hydrocracking catalyst prior to introduction of the liquid hydrocarbon feed stock. After suitable circulating conditions have been achieved, the liquid hydrocarbon feed stock is then intimately contacted with the mass of catalyst together with the circulating stream of gaseous hydrogen. The pressure within the hydrocracking reaction zone is maintained so that substantially all of the hydrocarbon feed stock during the reduction and sulfiding operations is in liquid phase. The mass of hydrocracking catalyst is also intimately contacted with a sulfur compound selected from the sulfur compounds consisting of hydrogen sulfide, alkyl mercaptans and alkyl sulfides. The sulfur compound may be present in the liquid hydrocarbon feed stock or the circulating gaseous hydrogen stream or both streams. When the sulfur compound is present in the circulating gaseous hydrogen stream, it is generally present as hydrogen sulfide as this material is generally gaseous in form and easily maintained in admixture with the circulating hydrogen gas stream. The sulfur compound is not necessarily limited to the single use of hydrogen sulfide or alkyl sulfides or alkyl mercaptans but may include various combinations thereof introduced into the hydrocracking reaction catalyst mass via the liquid hydrocarbon feed stream or the circulating gaseous hydrogen stream or both the liquid hydrocarbon feed stream and the circulating gaseous hydrogen.

It is preferred in the reduction and sulfiding activation steps disclosed herein that the quantity of sulfur compounds present in the form of hydrogen sulfide or alkyl mercaptans or alkyl sulfides or combinations thereof be passed into the hydrocracking reaction zone in sufficient concentration to allow sulfiding of metallic components present in the hydrocracking catalyst in a reasonable length of time. Knowing the metal content present in the hydrocracking catalyst and a concentration of the sulfur compound passing into the hydrocracking reaction zone at a given flow rate and assuming essentially complete conversion of the metal to sulfides, it is possible without much difficulty to calculate the time required for sulfiding. It is preferred to employ sulfur concentrations in excess of about 50 wt. p.p.m. concentration based on the total mass of material passing into the hydrocracking reaction zone.

In some instances, there is a relatively small amount of the sulfur compound passing into the hydrocracking catalyst mass which results in prolonged sulfiding operations. In these special cases, additional amounts of sulfur compound may be injected into the reaction zone through the liquid hydrocarbon feed stock or the gaseous hydrogen or both the liquid hydrocarbon feed stock and the gaseous hydrogen. The additional quantity of the sulfur compound, when needed, may be premixed with the liquid hydrocarbon feed stock prior to introduction into the hydrocracking catalyst reaction zone. It is necessary, when sulfur compound injection is used, than the additive sulfur compound which contacts the mass of hydrocracking catalyst be stopped after reduction and sulfiding operations have taken place.

After the reduction and sulfiding operations have taken place, the hydrocracking catalyst reaction zone is then increased in temperature at a rate of less than about 100° F. per hour to a temperature below about 850° F. to effect hydrocracking of the feed stock passing through the mass of hydrocracking catalyst.

The method of activation of a hydrocracking catalyst as disclosed herein can also be used in series flow hydrorefining-hydrocracking processes and two stage flow hydrorefining-hydrocracking processes with a stripping stage located between the hydrorefining reaction zone and the hydrocracking reaction zone. The stripping zone is used to remove nitrogen and sulfur compounds, which have been converted to primarily hydrogen sulfide and ammonia in the hydrorefining zone and which are substantially removed from the hydrorefined hydrocarbon stock withdrawn from the hydrorefining zone.

In the dual reaction zone hydrorefining-hydrocracking operations, it is possible to start-up the hydrorefining zone and use the hydrorefined liquid stock as the liquid hydrocarbon feed to the hydrocracking zone for activating the hydrocracking catalyst. This simplifies the start-up procedure for the entire two stage process.

In two stage flow hydrorefining-hydrocracking operations in which a stripping zone is used to separate some of the gaseous products from the hydrorefined effluent material, the hydrorefined liquid hydrocarbon material passing into the hydrocracking zone during reduction and sulfiding operations may not provide a sufficient quantity of sulfur to sulfide the catalyst in a reasonable period of time. An additive sulfur compound can then be used to increase the rate of sulfiding by injecting the additive sulfur compound into the gaseous hydrogen stream or the liquid hydrocarbon stream or both the liquid and gaseous streams passing into the hydrocracking zone. After a sulfur breakthrough has occurred, the additive sulfur compound is no longer passed into the hydrocracking zone.

Hydrocracking feed stocks which may be employed herein include general mineral oil fractions, boiling above about 300° F. and usually above about 400° F. and having an end boiling point of up to about 1000° F., such as straight-run gas oils, coker distillate gas oils, deasphalted crude oils and cycle oils derived from catalytic or thermal cracking. Such fractions may be derived from petroleum crude oils, shale oils, tar sand oils, coal hydrogenation products and the like. Specifically, it is preferred to employ feed stocks boiling between about 400° F. and 1050° F., having an API gravity of about 15° to about 40° and containing at least about 20% by volume of acid soluble components (aromatics plus olefins). Such oils may originally contain about 0.01% to about 5% by weight of sulfur and about 0.01% to about 2% by weight of nitrogen and, prior to being hydrocracked, are preferably subjected to a hydrorefining operation designed to decompose nearly all of the organic sulfur, nitrogen and oxygen compounds therein.

The gaseous hydrogen stream used in reduction and sulfiding of the hydrocracking catalyst should be a relatively pure hydrogen gas. It is preferred that the gaseous hydrogen stream used in the process of this invention for the activation of the hydrocracking catalyst be at least greater than about 80 mol percent of hydrogen. When hydrogen sulfide gas is used, the total gas purity including hydrogen and hydrogen sulfide should be above 80 mol percent. In some instances, it is possible to use refinery gas streams containing large amounts of hydrogen which generally can be taken from hydrogen producing units within the refinery, such as reformers and other basic dehydrogenation type processes. Small amounts of light hydrocarbons ($C_4$ and lighter gases) present in the gaseous stream passing into the hydrocracking catalyst during reduction sulfiding operations do not appear to detrimentally affect resulting catalyst activity and selectivity. The maximum amount of light hydrocarbons allowable in the gaseous hydrogen stream is about 20 mol percent.

In the method of activation of a hydrocracking catalyst as disclosed here, the hydrocracking catalyst is contacted with a relatively pure gaseous hydrogen stream at a superatmospheric pressure and a temperature within the range of from about 0° F. to about 350° F. The upper temperature limit which can be used when the hydrocracking catalyst is in contact at superatmospheric pressure with the gaseous hydrogen is limited in that the temperature should be below the temperature at which reduction of the metal present in the hydrocracking catalyst occurs. During reduction of most oxide metals, water is formed and in the method of the activation of this invention it is preferred to have a liquid hydrocarbon stream in contact with the hydrocracking catalyst when there is any possibility of the production of water or the possibility of the presence of large quantities of native water contacting the catalyst. The liquid hydrocarbon stream, which is contacted with the gaseous hydrogen and hydrocracking catalyst, appears to be partially adsorbed by the hydrocracking catalyst. Subsequent contacting of the hydrocracking catalyst with large amounts of native water or water from reduction reactions does not allow appreciable water adsorption by the hydrocracking catalyst because of the hydrocracking catalyst's previous contact with the liquid hydrocarbon stream.

After the hydrocracking catalyst and the gaseous hydrogen stream and the liquid hydrocarbon and sulfur compound have contacted the hydrocracking catalyst mass, the temperature of the resulting mixture is then increased to a temperature in the range of from about 350° F. to about 500° F. while maintaining the mixture of catalyst, gaseous hydrogen, liquid hydrocarbon and sulfur compound at a pressure of from about 500 p.s.i.g. to about 3000 p.s.i.g. to keep primarily liquid material in contact with the catalyst. Reduction and sulfiding operations take place under these conditions, and the water produced during the reduction of the metal is not adsorbed by the catalyst because of the previous contact of the catalyst mass with the liquid hydrocarbon stream and passes through the hydrocracking reaction zone without having the opportunity to detrimentally alter the hydrocracking catalyst selectivity and activity.

Complete reduction and sulfiding of the metallic component or components of the hydrocracking catalyst is generally determined by the presence of hydrogen sulfide in the effluent gas leaving the hydrocracking reaction zone. The presence of unreacted sulfur compounds, such as hydrogen sulfide, alkyl mercaptans and alkyl sulfides is an indication that substantially all of the metallic components present in the hydrocracking catalyst in the hydrocracking reaction zone, which are capable of being sulfided have been sulfided. After this sulfur breakthrough is recognized, the hydrocracking catalyst reaction zone is then increased in temperature at a rate of less than about 100° F. to a temperature of less than about 850° F. to effect hydrocracking of the hydrocarbon material passing into the hydrocracking reaction zone. During this step, it may be necessary under certain conditions to change the hydrocarbon material passing into the hydrocracking reaction zone. As has been mentioned before, it is preferable when reducing and sulfiding the hydrocracking catalyst to limit the liquid hydrocarbon feed stocks that contact the hydrocracking catalyst to those stocks having organic nitrogen contents of less than about 200 wt. p.p.m. After sulfiding is complete, normal charge stocks may be processed.

The two quantities that readily give a basis for comparative catalyst evaluation when using the method of activation of this invention, are the average catalyst bed temperature and the butane and lighter gas yield. The average bed temperature is an indication of the activity of the catalyst since this temperature is controlled by the conversion and is the temperature required to approach 100% liquid volume conversion of fresh feed into gasoline and lighter components. The butane and lighter gas yield is a measure of selectivity in terms of undesirable light ends. Thus, a comparatively low catalyst bed temperature and low butane and lighter gas yield would be found for a catalyst of high activity and favorable selectivity. The invention and the benefits afforded therefrom are illustrated in the following examples which are not intended to be limiting in scope.

Example I.—Example I was used as a base case to determine the benefit afforded by the use of the activation method of this invention. The catalyst used in this example was a high purity type Y faujasite, which contained approximately 5.3 wt. percent nickel, based on the element nickel, in the finished catalyst. The finished catalyst had an LOI at approximately 900° C. of about 20 wt. percent. The catalyst used in this example prior to impregnation with nickel was decationized, that is, the faujasite was ion-exchanged with an ammonium salt solution and thereafter calcined at a temperature high enough to drive off ammonia leaving a hydrogen form of the faujasite which was subsequently impregnated with a solution of nickel nitrate and then washed and dried to give a finished catalyst. The finished catalyst was then reduced and sulfided under laboratory conditions in which the sulfiding reactions took place in an essentially dry system. The catalyst used in this example is commonly referred to as a commercial grade pre-reduced and sulfided hydrocracking catalyst.

Since the catalyst used in this example was pre-reduced and sulfided, it was not necessary to perform any reduction or sulfiding operations prior to the introduction of the feed before start-up. This catalyst was loaded into a catalyst testing plant and run at conditions shown below in order to generate data which could be used in comparing the selectivity and activity of this catalyst with a similar catalyst which was reduced and sulfided according to the methods set forth in this disclosure.

The catalyst testing unit which was used to evaluate the performance of the catalyst used in this example and in subsequent examples, was essentially a single reaction zone type plant with general flow scheme as described below. Fresh feed together with a recycle stream, which was made up of hydrocracking reaction zone effluent which boiled above about 400° F., was passed in admixture with a hydrogen rich gaseous stream into the hydrocracking reaction zone, which contained about 400 cc. of the selected hydrocracking catalyst. The effluent from the hydrocracking catalyst reactor was then passed to a high pressure separator wherein liquid and gaseous streams were separated. The gaseous stream comprised primarily hydrogen with the mol percent of the recycled gas being in excess of 95 mol percent hydrogen for all the examples presented here. The liquid effluent from the high pressure separator was then passed into a stripper column. The stripper column separated primarily gases having molecular weights of four carbon numbers or less from the liquid effluent passing out of the high pressure separator. The bottoms stream from the stripper column which comprises $C_5+$ hydrocarbon material was then passed into a recycle column. The recycle column separated any $C_4$ and lighter hydrocarbons which were not removed in the stripper column, gasoline fractions boiling in the range from about 100° F. to about 420° F. and recycle column bottoms boiling above about 420° F. The recycle column bottoms were recycled back in admixture with the fresh feed to the reaction zone to be further hydrocracked to gasoline and lighter components. In this example and in all subsequent examples, the catalysts which were evaluated were tested at 100 liquid volume percent conversion of fresh feed. 100 liquid volume percent conversion as used in this and subsequent examples, is defined as essentially complete conversion of the fresh feed passing into the hydrocracking reaction zone to gasoline and lighter hydrocarbons. This results in a steady quantity of recycle column bottoms being recycled together with the fresh feed into the hydrocracking reaction zone. There is no build up of recycled column bottom material during 100 liquid volume percent conversion conditions.

In this example and in all subsequent examples, the hydrocracking reaction conditions included a pressure in the reaction zone of about 1500 p.s.i.g., a liquid hourly space velocity into the hydrocracking reaction zone of about 1.0, based on fresh feed rate, a combined feed ratio of about 2 (combined feed ratio equals the fresh feed rate plus the recycled column bottom rate all divided by the fresh feed rate), a hydrogen circulation rate in the reaction zone of about 10,000 cubic feet per barrel based on fresh feed rate and a catalyst temperature required to convert about 100 liquid volume percent of the fresh feed to gasoline or the lighter weight components. The feed stock used for all examples given was analyzed and is reported in Table I below.

TABLE I

| | |
|---|---|
| Gravity, °API at 60° F. | 29.1 |
| Specific gravity, at 60° F. | 0.8811 |
| IBP | 210 |
| 5% vol. | 450 |
| 10 | 464 |
| 30 | 478 |
| 50 | 494 |
| 70 | 518 |
| 90 | 576 |
| 95 | 598 |
| EP | 660 |
| Total sulfur, wt. p.p.m. | 2000 |
| Organic nitrogen, wt. p.p.m. | 85 |
| Water, wt. p.p.m. | 2000 |
| Aromatics LV percent | 53.9 |
| Olefins | 0 |
| Saturates | 46.1 |
| Micro C/H, wt. percent | 86.99/11.67 |

After suitable steady state operations were achieved after a standard start up using the pre-reduced and presulfided hydrocracking catalyst, an 18-hour test was run on the catalyst with the results of that test shown below in Table II.

TABLE II

Catalyst type—Type Y faujasite structure impregnated with nickel while in H form. Approximate analyses: 5.3 wt. percent Ni; 20 wt. percent LOI at 900° C.; 0.62 ABD (gms./cc.); pre-reduced and sulfided under dry laboratory conditions after impregnation.

Catalyst life, b.p.p.[1] _____ 0.40
Average catalyst bed temperature, ° F. _____ 706

Yields [2], wt. percent:
$C_1$ _____ 0.05
$C_2$ _____ 0.24
$C_3$ _____ 5.42
$C_4$ _____ 14.11

Total $C_4$ and lighter _____ 19.82

Total $C_5$ _____ 11.59
Total $C_6$ _____ 12.21
Total $C_7$ and heavier _____ 59.53
Total chemical hydrogen consumption [3], s.c.f.b. __ 1933

[1] Based on barrels of fresh feed processed for each pound of catalyst (b.p.p.).
[2] Includes hydrogen consumed in hydrocracking reactions, based on wt. percent of fresh feed processed.
[3] In standard cubic feet of hydrogen per barrel of fresh feed processed.

Example II.—The catalyst used in this example was identical to the catalyst used in Example I, except that the catalyst used in this example was not pre-reduced and sulfided and was loaded into the hydrocracking reaction zone in an oxidized state. After loading of this catalyst into the hydrocracking reaction zone under a suitable gas purge, the catalyst was then reduced and sulfided in situ using a gaseous reduction and sulfiding operation with intermittent high temperature gas purges to remove entrained water and water from reduction reactions present in the hydrocracking reaction zone. The reduction and sulfiding operations are substantially described below.

The hydrocracking reaction zone was purged using nitrogen at about 100 p.s.i.g. The reactor was then pressured up to about 300 pounds p.s.i.g. with a 2% oxygen-98% nitrogen gaseous mixture. The oxygen-nitrogen mixture was circulated while the reactor temperatures were raised at about 100° F. per hour to about 800° F. The plant was held at 800° F. and 300 p.s.i.g. with the 2% oxygen-98% nitrogen gaseous stream circulating for approximately two hours through the reactor in order to dry out the system and the hydrocracking catalyst. The reactor was then cooled and held at approximately 300° F. Nitrogen was then bled through the plant until the effluent gas from the hydrocracking reactor had a water concentration which was below its saturation concentration at room temperature. The plant was then purged with a pure nitrogen gaseous stream at about 200 p.s.i.g. After substantially all of the oxygen had been removed from the reaction zone and other lines in the plant, the inlet gas stream to the hydrocracking reaction zone was switched to a 25% hydrogen-75% nitrogen gaseous mixture. The effluent gas stream passing through the hydrocracking reaction zone was monitored for water content. The hydrocracking reaction temperatures were raised at about 100° F. per hour to a temperature of about 775° F. and were held at that temperature for about two hours. After the two hour period, hydrogen was bled through the plant until essentially pure hydrogen was passing through the hydrocracking catalyst. The plant pressure was then slowly raised to 1500 p.s.i.g. with hydrogen while maintaining the water content of the effluent gas from the hydrocracking reaction zone close to its saturation water concentration when measured at room temperature at plant pressure. The water content of the gas passing through the hydrocracking reaction zone was maintained at its water saturation concentration by addition of small amounts of fresh dry hydrogen to the plant at the high pressure and high temperature. The reactor was then cooled to about 700° F. and the catalyst was sulfided using a 1% hydrogen sulfide-99% hydrogen gas mixture. After a noticeable breakthrough of hydrogen sulfide in the effluent gas stream passing out of the hydrocracking reaction zone, the reactor was cooled to ambient temperatures and the plant was started up using the feed stock described in Table I.

It is believed that a continuous high pressure operation can be used in reduction and sulfiding operations with no substantial variance from the results achieved using the reduction and sulfiding operations previously mentioned in this example.

The charge stock was cut into the hydrocracking reaction zone at ambient temperatures, 1500 p.s.i.g., a liquid hourly space velocity based on fresh feed of approximately 1, no recycle column bottoms recycle stream, and a hydrogen circulation rate through the hydrocracking reactor of about 10,000 standard cubic feet per barrel based on the fresh feed flowing into the hydrocracking reaction zone. The hydrocracking reaction zone temperatures were increased at a rate below about 100° F. to about a temperature of 575° F. After a suitable amount of recycle column bottoms recycle material was collected, a recycle stream was started back to the hydrocracking reaction zone. The combined feed ratio was then maintained at about 2.0. Reactor temperatures were then increased to a temperature which allowed approximately 100 liquid volume percent of the fresh feed passed into the hydrocracking reaction zone to be converted to gasoline and ligther weight components (material boiling below about 420° F.).

After suitable steady state operations were achieved and 100 liquid volume percent conversion was occurring, an 18-hour test was run on the plant. Results of this test are shown below in Table III.

TABLE III

Catalyst type—Type Y faujasite structure, impregnated with nickel while in H form. Approximate analyses: 5.3 wt. percent Ni; 20 wt. percent LOI at 900° C.; 0.62 ABD (gms./cc.); this catalyst was in an oxidized form prior to reduction and sulfiding as done in this example.

Catalyst life, b.p.p.[1] _____ 0.41
Average catalyst bed temperature, ° F. _____ 750

Yields [2], wt. percent:
$C_1$ _____ 0.15
$C_2$ _____ 0.45
$C_3$ _____ 7.73
$C_4$ _____ 16.59

Total $C_4$ and lighter _____ 24.92

Total $C_5$ _____ 11.55
Total $C_6$ _____ 11.18
Total $C_7$ and heavier _____ 55.82
Total chemical hydrogen consumption [3], s.c.f.b. __ 2120

[1] Based on barrels of fresh feed processed for each pound of catalyst (b.p.p.).
[2] Includes hydrogen consumed in hydrocracking reactions.
[3] In standard cubic feet of hydrogen per barrel of fresh feed processed.

Example III.—The catalyst used in this example was similar to the catalyst used in Example II. The catalyst used in Example III was loaded into the hydrocracking reactor in oxidized state and was reduced and sulfided using the method of activation of this invention.

The description of the in situ reduction and sulfiding of this oxidized hydrocracking catalyst is explained as follows. A preliminary low pressure nitrogen gas purge was passed through the entire system to eliminate any oxygen and extremely large amounts of native water. The nitrogen gas in the hydrocracking reactor in connecting lines was then purged with hydrogen with the plant pressure raised to about 1500 p.s.i.g. while maintaining the reactor temperature at ambient temperatures. The feed stock as described in Table I above was then passed into the hydrocracking reaction zone at a liquid hourly space velocity based on fresh feed of approximately 1, with hydrogen circulating through the hydrocracking reaction zone at 10,000 standard cubic feet per barrel based on the fresh feed charge rate.

The hydrocracking catalyst reaction zone temperature was then increased at a rate of about 20° F. per hour to a temperature of about 400° F. then held at that temperature for about 8 hours. After an 8-hour hold period at 400° F., samples of the hydrocracking reactor effluent gas were taken to determine if there was a breakthrough of hydrogen sulfide. Two consecutive samples of the hydrocracking reaction zone gaseous effluent indicated that the gas contained an excess of 20 grains of hydrogen sulfide per 100 standard cubic feet of the effluent gas. This indicated that most of the metals in the hydrocracking catalyst had been reduced and sulfided. The hydrocracking catalyst temperatures were then increased at a rate of less than about 100° F. per hour to a temperature which resulted in conversion of a substantial amount of feed stock into the gasoline and lighter components (420° F. and lower-boiling material). After a suitable amount of recycle bottoms material was produced in the recycle column, recycle operations were started and the combined feed ratio was lined out at approximately 2.0 using the recycle column bottoms recycle stream. The temperature of the hydrocracking reaction zone was then increased to maintain 100 liquid volume percent conversion of the fresh feed while maintaining a constant rate of production of the recycle column bottoms material.

After steady state operations had taken place, an 18-hour test was run. The results of this test are shown in Table IV.

TABLE IV

Catalyst type—Type Y faujasite structure, impregnated with nickel while in H form. Approximate analyses: 5.3 wt. percent Ni; 20 wt. percent LOI at 900° C.; 0.62 ABD (gms./cc.). This catalyst was in the oxidized form and was reduced and sulfided according to the method of this invention.

| | |
|---|---|
| Catalyst life, b.p.p.[1] | 0.67 |
| Average catalyst bed temperature, ° F. | 679 |
| Yields[2], wt. percent: | |
| $C_1$ | 0.04 |
| $C_2$ | 0.30 |
| $C_3$ | 4.09 |
| $C_4$ | 11.24 |
| Total $C_4$ and lighter | 15.67 |
| Total $C_5$ | 10.28 |
| Total $C_6$ | 11.20 |
| Total $C_7$ and heavier | 65.90 |
| Total chemical hydrogen consumption[3], s.c.f.b. | 1881 |

[1] Based on barrels of fresh feed processed for each pound of catalyst (b.p.p.).
[2] Includes hydrogen consumed in hydrocracking reactions.
[3] In standard cubic feet of hydrogen per barrel of fresh feed processed.

Table V is a summary of the results of catalyst performance for the three above examples.

TABLE V

| Brief description of catalyst and method of activation used | $C_4$ and lighter yield, wt. percent | Average catalyst bed temp. required for 100 LV percent conversion, ° F. |
|---|---|---|
| Example I: Pre-reduced and sulfided | 19.82 | 706 |
| Example II: Oxidized catalyst reduced and sulfided in presence of water saturated $H_2S+H_2$ gas streams | 24.92 | 750 |
| Example III: Oxidized catalyst reduced and sulfided according to methods of this invention | 15.67 | 679 |

The catalyst of Example III showed the best selectivity and activity of all three examples as seen by the lowest temperature requirement for 100 LV percent conversion of fresh feed and the lowest amount of $C_4$ and less hydrocarbons produced. In Example III the liquid hydrocarbon feed which was passed through the catalyst bed during reduction and sulfiding operations prevented the water which was present in the system from damaging the catalyst. Also of particular importance is the superior performance of the catalyst in Example III when compared to pre-reduced and sulfided catalyst which was tested in Example I. Thus, the method of this invention gives a superior reduction and sulfiding procedure when water is present in the catalyst system and additionally gives a catalyst which is also superior when compared to a catalyst reduced and sulfided under controlled dry laboratory conditions.

DESCRIPTION OF THE PREFERRED EMBODIMENTS

In a broad embodiment, this process relates to a method for the activation of a mass of a hydrocracking catalyst containing at least one metallic component present in an oxidized form. The activation method comprises the steps of: intimately contacting a mass of catalyst with a stream of gaseous hydrogen at a temperature within the range of from about 0° F. to about 350° F. and at an elevated pressure; further contacting the mass of catalyst and the gaseous hydrogen in contact with the catalyst with a hydrocarbon feed stock and a sulfur compound; the hydrocarbon feed stock is maintained in substantially liquid phase to effect adsorption of a part of the hydrocarbon feed by the catalyst and the sulfur compound is selected from the group consisting of hydrogen sulfide, alkyl mercaptans and alkyl sulfides. The resulting mixture of catalyst, gaseous hydrogen, liquid hydrocarbon feed and the sulfur compound is then increased in temperature at a rate of less than about 100° F. per hour to a temperature within the range of from about 350° F. to about 500° F. while maintaining the mixture at an elevated pressure to maintain the hydrocarbon feed in substantially a liquid phase. The mixture is maintained at these conditions with a continuous circulation of a gaseous hydrogen stream and a liquid hydrocarbon into and out of the mass of hydrocracking catalyst until most of the metallic components present in the hydrocracking catalyst are reduced and sulfided. The temperature of the hydrocracking catalyst mass is then increased to a temperature to effect hydrocracking reactions.

We claim as our invention:
1. A method for the activation of a mass of a hydrocracking catalyst containing at least one metallic component present in an oxidized form, which method comprises the steps of:
   (a) intimately contacting said mass of catalyst with a stream of gaseous hydrogen at a temperature within the range of from about 0° F. to about 350° F. and at an elevated pressure greater than about 100 p.s.i.g.;
   (b) contacting the mass of catalyst with a hydrocarbon feed stock stream and a sulfur compound while circulating gaseous hydrogen through said catalyst mass, said hydrocarbon feed stock maintained at substantially liquid phase conditions to effect absorption of said hydrocarbon feed stock by the mass of catalyst, and said sulfur compound is selected from the group consisting of hydrogen sulfide, alkyl mercaptans and alkyl sulfides;

(c) raising the temperature of the mixture of catalyst, gaseous hydrogen, liquid hydrocarbon feed and the sulfur compound at a rate of less than about 100° F. per hour to a temperature within the range of from about 350° F. to about 500° F. and maintaining said mixture at a pressure within the range of from about 500 p.s.i.g. to about 3000 p.s.i.g. and for a sufficient time to effect the reduction and sulfiding of a major proportion of said metallic component, said hydrocarbon feed being maintained substantially in the liquid phase for the duration of this step (c);

(d) thereafter increasing the temperature of the catalyst mass at a rate of less than about 100° F. per hour to a temperature less than about 850° F. to effect hydrocracking reactions.

2. The process of claim 1 further characterized in that said hydrocracking catalyst comprises at least one metal selected from the group consisting of iron, cobalt, nickel, ruthenium, rhodium, palladium, osmium, iridium and platinum, which metal is combined with crystalline aluminosilicate faujasite.

3. The process of claim 1 further characterized in that said hydrocracking catalyst comprises an amorphous alumina-silica base containing at least one metal selected from the group consisting of iron, cobalt, nickel, ruthenium, rhodium, palladium, osmium, iridium and platinum.

4. The process of claim 2 further characterized in that said hydrocarbon feed stock contains less than 500 wt. p.p.m. nitrogen and less than about 500 wt. p.p.m. water.

5. The process of claim 2 further characterized in that said additive sulfur compound contacting the mass of catalyst is present in the liquid hydrocarbon feed in a form selected from the group consisting of alkyl mercaptans and alkyl sulfides.

6. The process of claim 2 further characterized in that said sulfur compound is present in the gaseous hydrogen stream as hydrogen sulfide.

7. The process of claim 3 further characterized in that said hydrocarbon feed stock contains less than about 500 wt. p.p.m. nitrogen and less than about 5000 wt. p.p.m. water.

8. The process of claim 3 further characterized in that said sulfur compound contacting the mass of catalyst is present in the liquid hydrocarbon feed in a form selected from the group consisting of alkyl mercaptans and alkyl sulfides.

9. The process of claim 3 further characterized in that said sulfur compound is present in the gaseous hydrogen stream as hydrogen sulfide.

10. In a dual reaction zone hydrorefining-hydrocracking process, a method for the activation of a mass of hydrocracking catalyst present in a second stage reaction zone and containing at least one metallic component in an oxidized form, which method comprises the steps of:

(a) reacting a hydrocarbon feed mixture at hydrorefining conditions in a first stage reaction zone to effect conversion of a portion of sulfur and nitrogen material present in said hydrocarbon feed mixture to hydrogen sulfide and ammonia respectively, and withdrawing from said first stage reactor a hydrorefined hydrocarbon stock and a first stage gaseous product stream;

(b) intimately contacting said hydrocracking catalyst disposed in the second stage reaction zone with a stream of gaseous hydrogen at a temperature within the range of from about 0° F. to about 350° F. and an elevated pressure greater than about 100 p.s.i.g.;

(c) contacting said hydrocracking catalyst in the second stage reaction zone with hydrorefined hydrocarbon stock withdrawn from the hydrorefining reactor and a sulfur compound while circulating gaseous hydrogen through said catalyst mass, said hydrorefined stock maintained in substantially liquid phase to effect adsorption of hydrorefined stock by the hydrocracking catalyst, said sulfur compound is selected from the group consisting of hydrogen sulfide, alkyl mercaptans and alkyl sulfides;

(d) raising the temperature of the mixture of hydrocracking catalyst, gaseous hydrogen, liquid hydrorefined hydrocarbon stock and the sulfur compound in said second stage reaction zone at a rate of less than about 100° F. per hour to a temperature within the range of from aboupt 350° F. to about 500° F. and maintaining said mixture at a pressure within the range of from about 500 p.s.i.g. to about 3000 p.s.i.g. and for a sufficient time to effect the reduction and sulfiding of a major portion of said metallic component present in the hydrocracking catalyst, said hydrocarbon feed stock being maintained substantially in the liquid phase for the duration of this step (d); and, (e) thereafter increasing the temperature of the hydrocracking catalyst in the second stage reaction zone at a rate less than about 100° F. per hour to a temperature of less than about 850° F. to effect hydrocracking reactions.

11. The process of claim 10 further characterized in that said hydrocracking catalyst comprises at least one metal selected from the group consisting of iron, cobalt, nickel, ruthenium, rhodium, palladium, osmium, iridium and platinum, which metal is on a crystalline aluminosilicate faujasite.

12. The process of claim 11 further characterized in that substantially all of the hydrorefined stock and first stage gaseous product withdrawn from the first stage hydrorefining zone pass directly into the second stage hydrocracking reaction zone.

13. The process of claim 11 further characterized in that substantially all of the hydrorefined stock withdrawn from the first stage hydrorefining zone passes directly into the second stage hydrocracking reaction zone.

14. The process of claim 11 further characterized in that said hydrorefined feed stock contains less than about 500 wt. p.p.m. nitrogen and less than about 5000 wt. p.p.m. water.

15. The process of claim 11 further characterized in that said sulfur compound contacting the mass of catalyst is present in the liquid hydrorefined hydrocarbon feed in a form selected from the group consisting of alkyl mercaptans and alkyl sulfides.

16. The process of claim 11 further characterized in that said sulfur compound is present in the gaseous hydrogen stream as hydrogen sulfide.

17. The process of claim 11 further characterized in that said hydrocracking catalyst comprises nickel on a high silica to alumina ratio crystalline aluminosilicate faujasite.

18. The process of claim 10 further characterized in that said hydrocracking catalyst comprises an amorphous alumina-silica base containing at least one metal selected from the group consisting of iron, cobalt, nickel, ruthenium, rhodium, palladium, osmium, iridium and platinum.

19. The process of claim 18 further characterized in that said hydrorefined stock contains less than about 500 wt. p.p.m. nitrogen and less than about 5000 wt. p.p.m. water.

20. The process of claim 18 further characterized in that said sulfur compound contacting the mass of hydrocracking catalyst is present in the hydrorefined liquid hydrocarbon in a form selected from the group consisting of alkyl mercaptans and alkyl sulfides.

21. The process of claim 18 further characterized in that said sulfur compound is present in the gaseous hydrogen stream as hydrogen sulfide.

22. A method for the activation of a mass of a hydrocracking catalyst containing at least one metallic component present in an oxidized form, which method comprises intimately contacting said catalyst mass with a mixture of gaseous hydrogen, liquid hydrocarbon and a sulfur compound at a temperature of about 350° F. to 500° F. for a sufficient time to effect the reduction and sulfiding of a major proportion of said metallic component, said hydrocarbon being maintained substantially in the liquid phase for the duration of this contacting step, and thereafter increasing the temperature of said catalyst mass to a temperature less than about 850° F. but sufficient to effect hydrocracking reactions.

References Cited

UNITED STATES PATENTS 3,211,642  10/1965  Unverferth ---------- 208—111
3,287,257  11/1966  Hansford et al. ------ 208—111

PAUL M. COUGHLAN, JR., Primary Examiner

R. BRUSKIN, Assistant Examiner

U.S. Cl. X.R.

208—120